United States Patent
Gong et al.

(10) Patent No.: US 10,343,457 B2
(45) Date of Patent: Jul. 9, 2019

(54) MULTI-CHAMBER TIRE

(71) Applicant: CHENGDU YOUYANG ELECTROMECHANICAL PRODUCT DESIGN CO., LTD., Chengdu, Sichuan Province (CN)

(72) Inventors: Shugang Gong, Shenzhen (CN); Wen Zhang, Shenzhen (CN); Xingyin Wu, Shenzhen (CN); Zhihua Hu, Shenzhen (CN); Dandan Luo, Shenzhen (CN)

(73) Assignee: Chengdu Youyang Electromechanical Product Design Co., Ltd., Chengdu, Sichuan (CN)

( * ) Notice: Subject to any disclaimer, the term of this patent is extended or adjusted under 35 U.S.C. 154(b) by 0 days.

(21) Appl. No.: 15/024,158

(22) PCT Filed: Sep. 24, 2013

(86) PCT No.: PCT/CN2013/084109
§ 371 (c)(1),
(2) Date: Mar. 23, 2016

(87) PCT Pub. No.: WO2015/042782
PCT Pub. Date: Apr. 2, 2015

(65) Prior Publication Data
US 2016/0229228 A1    Aug. 11, 2016

(51) Int. Cl.
*B60C 5/24* (2006.01)
*B60C 5/22* (2006.01)
*B60C 23/19* (2006.01)

(52) U.S. Cl.
CPC .............. *B60C 5/24* (2013.01); *B60C 5/22* (2013.01); *B60C 23/19* (2013.01)

(58) Field of Classification Search
CPC .............. B60C 5/24; B60C 5/22; B60C 23/19
See application file for complete search history.

(56) References Cited

U.S. PATENT DOCUMENTS 4,054,169 A * 10/1977 Devienne ............... B60C 5/20
                                                    152/337.1
7,316,252 B1 * 1/2008 Heard .................... B60C 5/22
                                                    152/196
(Continued)

FOREIGN PATENT DOCUMENTS

CN        1739989        3/2006
CN        2813340        9/2006
(Continued)

OTHER PUBLICATIONS

International Search Report of PCT/CN2013/084109 dated Apr. 3, 2014.

*Primary Examiner* — Jacob T Minskey
*Assistant Examiner* — Melody Tsui
(74) *Attorney, Agent, or Firm* — Rankin, Hill & Clark LLP (57) ABSTRACT

A multi-chamber tire, comprising an outer layer portion and an flexible ring body in an annular fashion; the outer layer portion is arranged on the external side of the flexible ring body; the flexible ring portion is provided with chambers arranged around the flexible ring portion; the chambers are provided with a plurality of partitioned gussets; each of the partitioned gussets is arranged around the flexible ring body and extends along the axial and radial directions, and the plurality of partitioned gussets are arranged around the flexible ring body alternately, dividing the chambers into a plurality of isolating chambers isolated from each other.

15 Claims, 7 Drawing Sheets

(56) References Cited

U.S. PATENT DOCUMENTS

2013/0033095 A1* 2/2013 Vargas .................... B60B 3/085
                                                        301/64.305
2015/0246494 A1* 9/2015 Onimatsu .............. B29D 30/12
                                                        264/236

FOREIGN PATENT DOCUMENTS

| CN | 2813340 Y | * | 9/2006 | | |
|----|-----------|---|--------|---|---|
| CN | 2897691   |   | 5/2007 | | |
| CN | 2897691 Y | * | 5/2007 | | |
| CN | 201544735 |   | 8/2010 | | |
| CN | 201808401 |   | 4/2011 | | |
| CN | 201808401 U | * | 4/2011 | ............. | B60B 11/04 |

* cited by examiner

MULTI-CHAMBER TIRE

FIELD OF THE INVENTION

The invention relates to the technical field of tires, especially to a multi-chamber tire.

BACKGROUND OF THE INVENTION

Tires are essential parts for each type of vehicle apparatus, a tire comprises an outer layer portion and a flexible ring portion; the outer layer portion and the flexible ring portion are respectively configured as annular shapes, and the outer layer portion is arranged around outside of the flexible ring portion and contacts with the ground directly when the tire is rolling.

As a flexible deformation body, the flexible ring portion is provided with a chamber which is arranged around the flexible ring portion; after the chamber is inflated, the tire can be ensured to keep a flexible state and withstand relatively big dynamic load along the radial direction, thereby ensuring the requirement of high-speed run. However, the flexible ring portion in the prior art is merely provided with a single chamber; when the outer layer portion is punctured and pierced by an external object, the entire chamber would be connected with the outside and hence air leakage would happen, and the flexible performance of the flexible ring portion would be extremely weakened. Therefore, during the rolling process, the tire can hardly withstand relatively big dynamic load along the radial direction to meet the requirement of high-speed run, and the entire tire would be prone to be damaged and scraped so that it is unable to use, which may significantly affect the service life and performance of the tire.

SUMMARY OF THE INVENTION

The purpose of the invention is to provide a multi-chamber tire, and to overcome the problem that the flexible ring portion of the tire in the prior art is merely provided with one chamber, and when the chamber is punctured and pierced by an external object, the tire can hardly withstand relatively big dynamic load and would be prone to be damaged and scraped so that it is unable to use.

The invention is achieved as follows: a multi-chamber tire comprising an outer layer portion and a flexible ring portion in an annular fashion; the outer layer portion is arranged on an external side of the flexible ring portion; the flexible ring portion is provided with a chamber arranged around the flexible ring portion; the chamber is provided therein with a plurality of partitioned gussets; each of the partitioned gussets is arranged to extend along axial and radial directions of the flexible ring portion, and the plurality of partitioned gussets are arranged alternately around the flexible ring portion so as to divide the chamber into a plurality of isolating chambers which are isolated from each other.

Compared with the prior art, in the multi-chamber tire, the flexible ring portion is provided with a plurality of isolating chambers; when the out layer portion is punctured by an external object and one isolating chamber is pierced, only a certain single isolating chamber is leaked; in this way, other un-punctured isolating chambers are still in the gas-filled state, and the tire can still function and run in a high speed, thereby withstanding relatively big dynamic load along the radial direction; when the external object punctures the out layer portion as well as adjacent isolating chambers, the isolated plate between the two adjacent isolating chambers withstands relatively big dynamic load, however, the tire can still function, and is adapt for running in a high speed; only in the case that adjacent isolating chambers are punctured by external bodies many times, the tire may be unsuitable to run in a high speed, and may require maintenance and repairing. Therefore, the multi-chamber tire can withstand the punctured situations many times and still meet the high-speed run requirement, so that the service life and performance of the tire are extremely improved.

DETAILED DESCRIPTION OF THE PREFERRED EMBODIMENT

The invention will be further described in detail accompanying with the drawings and embodiments in order to make the purpose, technical solutions and advantages of the invention more clear. It should be understood that the specific embodiments described herein are just for explanation and should not deemed as limitation to the invention.

The achievement of the invention will be described in detail accompanying with the specific embodiments.

Figure 1:
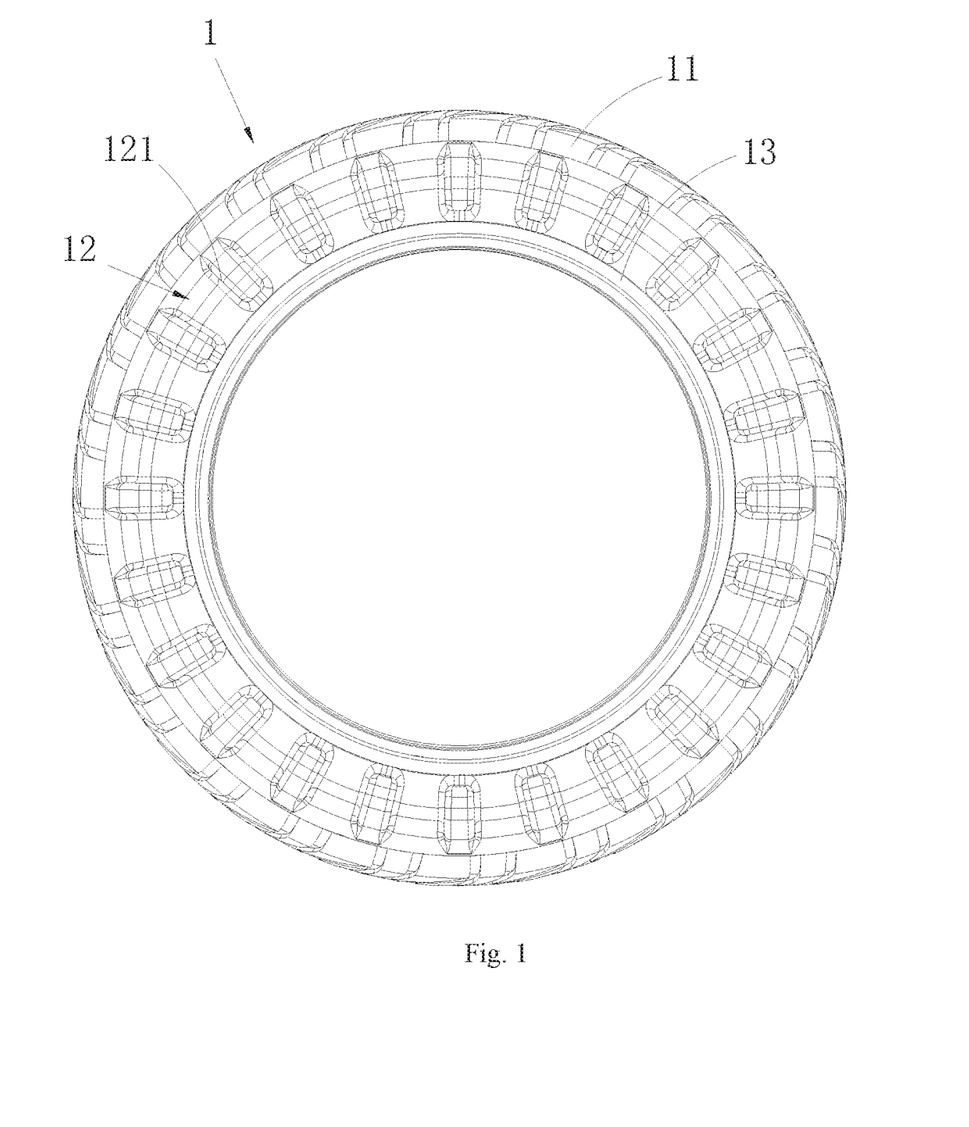
FIG. 1 is a front schematic view of a multi-chamber tire provided by an embodiment of the invention.
Figure 2:
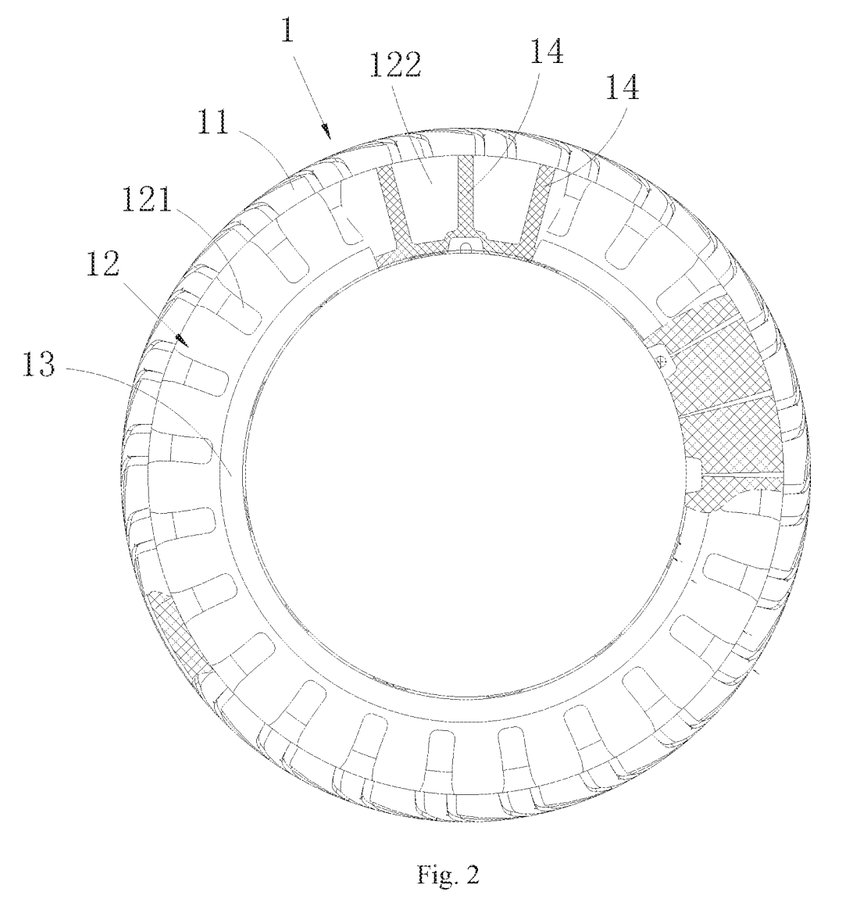
FIG. 2 is partial front schematic cut-away view of the multi-chamber tire provided by the embodiment of the invention.
Figure 3:
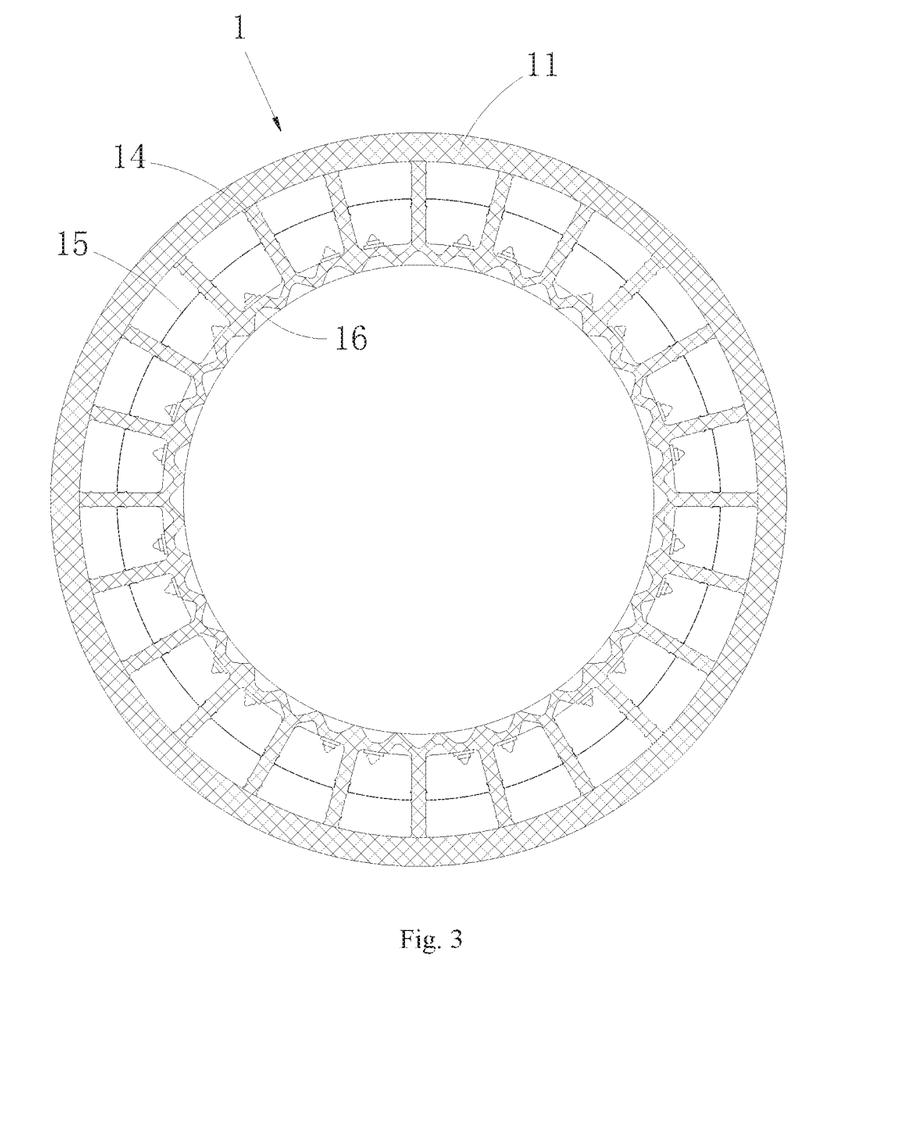
FIG. 3 is a first longitudinal schematic cut-away view of the multi-chamber tire provided by the embodiment of the invention.
Figure 4:
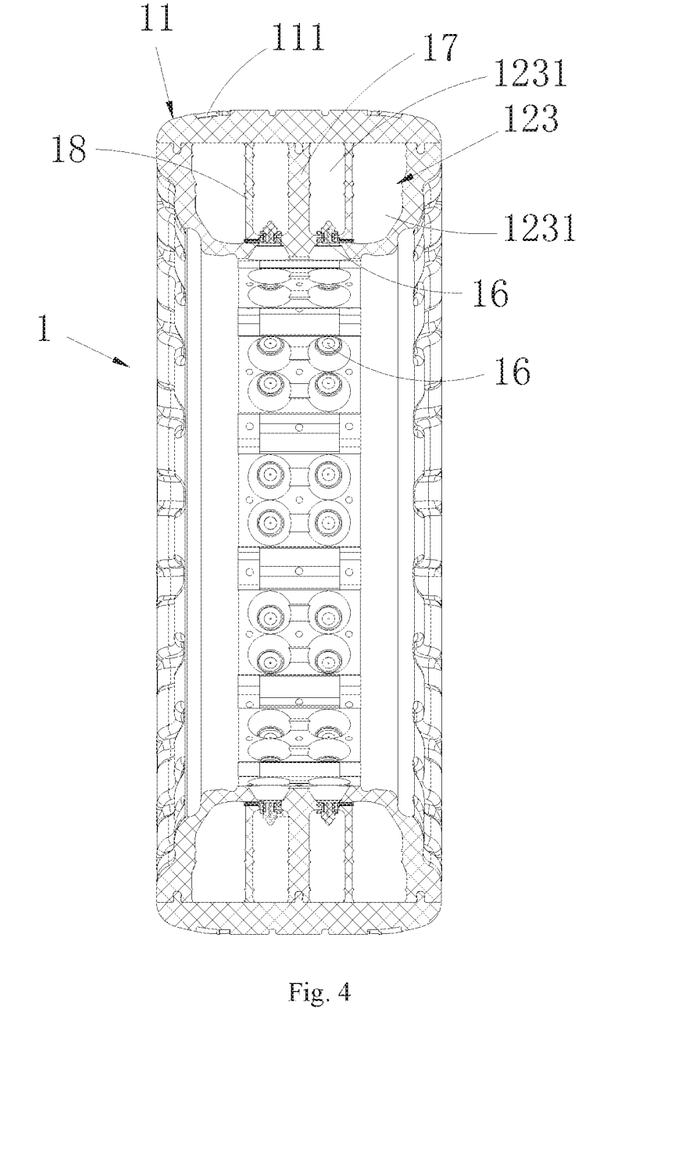
FIG. 4 is a second longitudinal schematic cut-away view of the multi-chamber tire provided by the embodiment of the invention.
Figure 5:
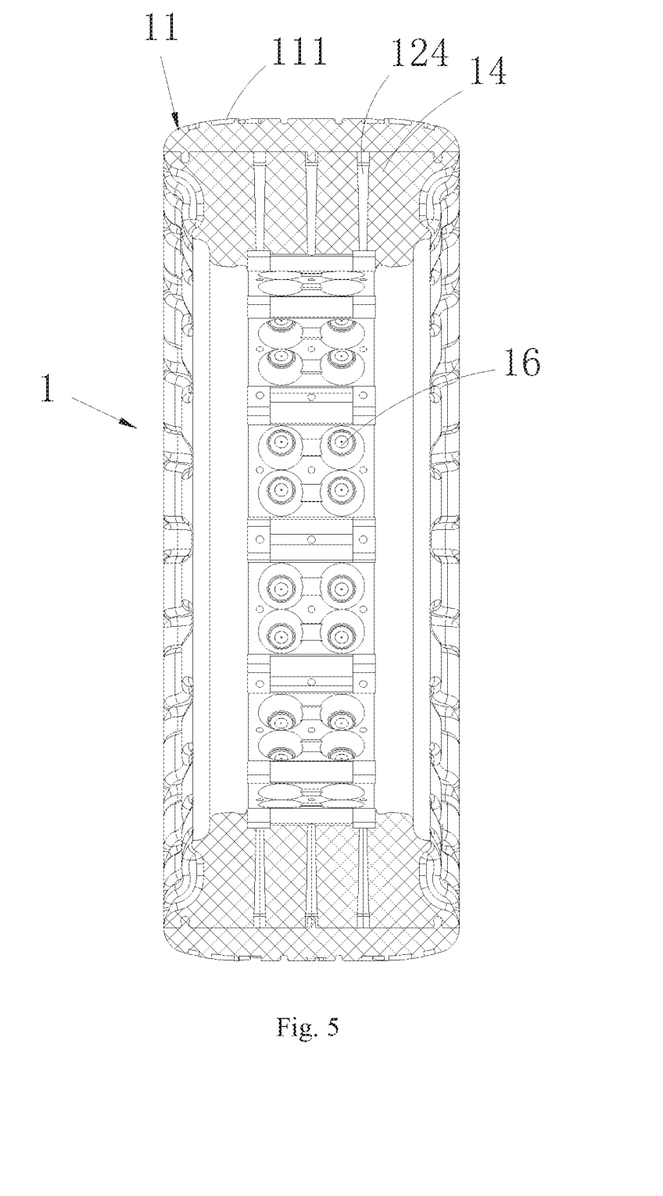
FIG. 5 is a third longitudinal schematic cut-away view of the multi-chamber tire provided by the embodiment of the invention.
Figure 6:
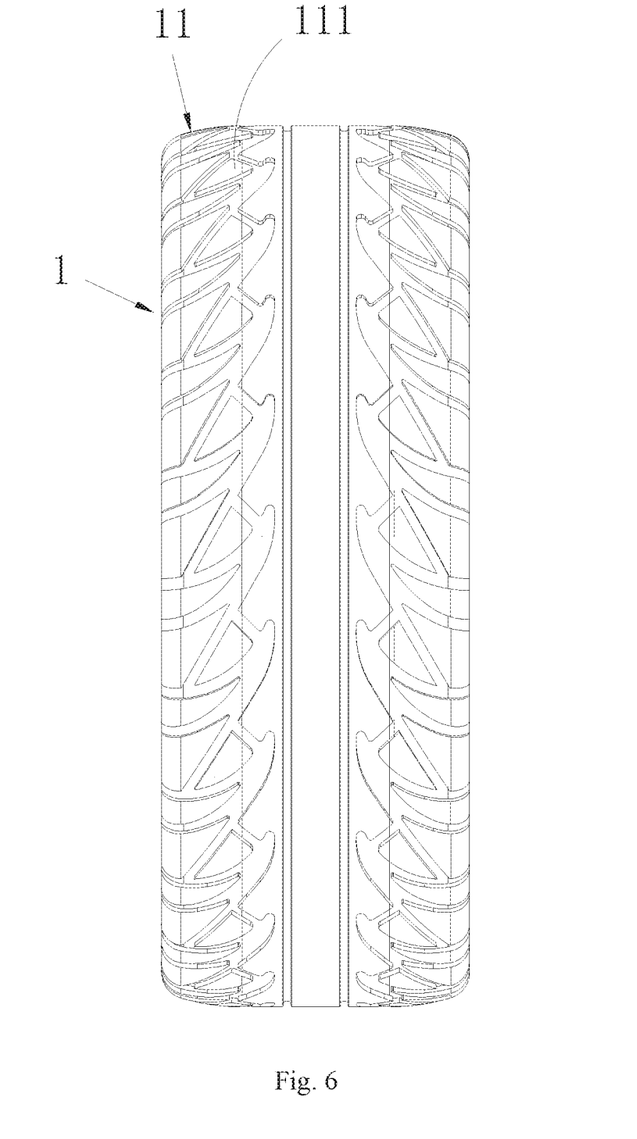
FIG. 6 is a left schematic view of the multi-chamber tire provided by the embodiment of the invention.
Figure 7:
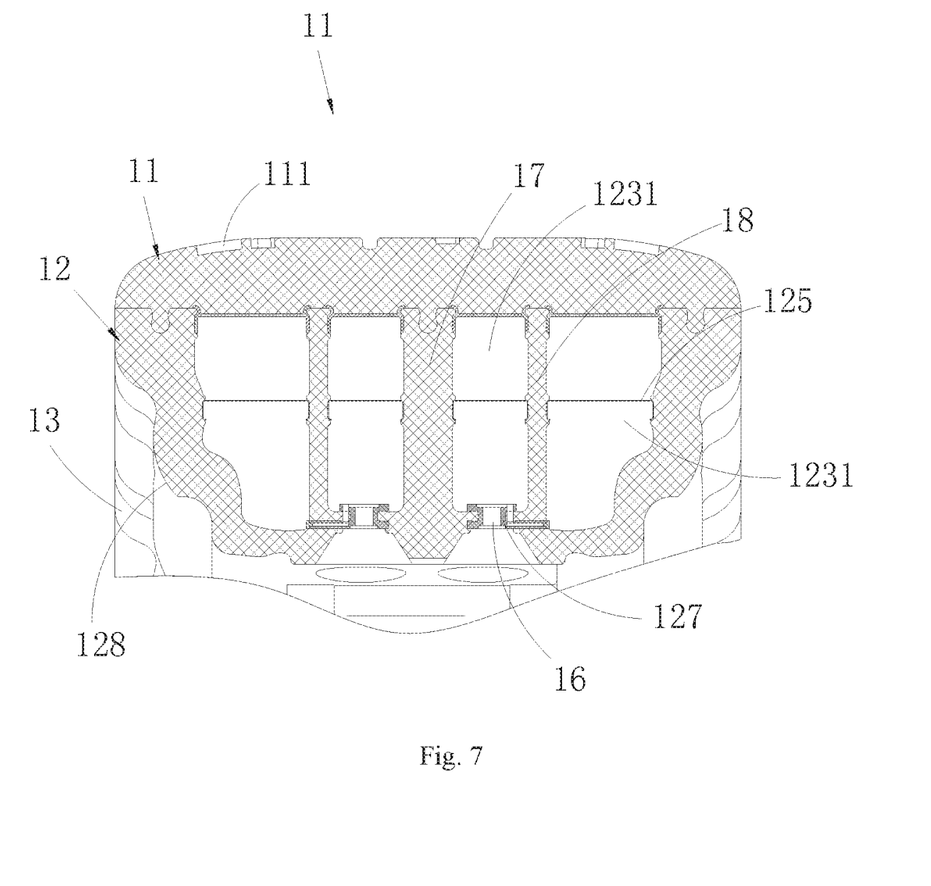
FIG. 7 is a partial longitudinal schematic cut-away view of the multi-chamber tire provided by the embodiment of the invention.

As shown in FIGS. 1-7, preferred embodiments of the invention are provided herein.

A tire 1 provided by one embodiment includes an outer layer portion 11 and a flexible ring portion 12; the outer layer portion 11 and the flexible ring portion 12 are respectively arranged in annular fashions and the outer layer portion 11 is arranged around an external side of the flexible ring portion 12. During the use of the tire 1, the outer layer portion 11 directly contacts with the external ground, therefore, the outer layer portion 11 is generally made of wear-resistant and antiskid material; the flexible ring portion 12 is a flexible deformation body, which ensures that the tire 1 is in a flexible deformation state so that the tire 1 meets the requirements of high-speed running; the flexible ring portion 12 is typically made of flexible material. In the embodiment, the flexible ring portion 12 is made of polyurethane material, surely, it can also be made of other types of material, and the material should not be limited to the embodiment.

In the embodiment, the flexible ring portion 12 is in a hollow shape, inside the flexible ring portion 12 there is provided with a chamber arranged around the flexible ring portion 12; the chamber of the flexible ring portion 12 is provided therein with a plurality of partitioned gussets 14; each of the partitioned gussets 14 is arranged to extend along axial and radial directions of the flexible ring portion 12, and the plurality of partitioned gussets 14 are arranged around the flexible ring portion 12 alternately; the partitioned gussets 14 is arranged to extend along the axial and radial directions of the flexible ring portion 12 divide the chamber into a plurality of isolating chambers 122 which are isolated from each other. In this way, the plurality of isolating chambers 122 are also arranged around the flexible ring portion 12.

Specifically, the above mentioned plurality of partitioned gussets 14 are evenly arranged, that is, distances between adjacent partitioned gussets 14 are identical; in this way, the plurality of partitioned chambers 122 formed are also evenly arranged. Surely, the partitioned gussets 14 can also be unevenly arranged according to actual needs, such that a plurality of unevenly arranged isolating chambers 122 are formed; the specific configurations can be set as appropriate.

In the tire 1 mentioned above, the flexible ring portion 12 forms the plurality of isolating chambers 122, and the plurality of isolating chamber 122 are arranged around the flexible ring portion 12. In this way, when the out layer portion 11 is punctured by an external object and one isolating chamber 122 is pierced, only one certain single isolating chamber 122 is leaked; other un-punctured isolating chambers 122 are still in a gas-filled state, and the tire 1 can still function and run in a high speed, thereby withstanding relatively big dynamic load along the radial direction; when the external object punctures the out layer portion 11 and pierces two adjacent isolating chambers 122 at the same time, the partitioned gusset 14 between the two adjacent isolating chambers 122 withstands relatively big dynamic load, the tire 1 can still function, and is suitable for running in a high speed; only in the case that adjacent isolating chambers 122 are punctured many times, the tire 1 may be unsuitable for running in a high speed and require maintenance and repairing.

Above all, the multi-chamber tire 1 provided by the embodiment can withstand multiple puncturing and still meet the high-speed run requirement, thereby extremely improving the service life and performance of the tire 1.

In the embodiment, an inner side of the flexible ring portion 12 is provided with an inner support ring 13; the inner support ring 13 is arranged around the flexible ring portion 12 and provided with a plurality of filling openings 16; the filling openings 16 is communicated with a corresponding isolating chamber 122 and exposed outside the inner support ring 13, in this way, an external filling equipment can be used to fill gas for the isolating chamber 122 of the flexible ring portion 12 directly through the filling opening 16.

Surely, adjacent isolating chambers 122 are isolated from each other, alternatively, in other embodiments, a plurality of isolating chambers 122 abutting in order form one chamber unit; in the chamber unit, the plurality of isolating chambers 122 are intercommunicated, however, adjacent chamber units are isolated from each other; in this way, one single filling opening 16 can be used to fill gas for the plurality of isolating chambers 122 of the chamber unit, which avoids the arrangement of redundant filling openings 16 and improves the utilization rate of the inner support ring 13.

In the embodiment, two adjacent isolating chambers 122 form the above mentioned chamber unit. Surely, it can also be more than two adjacent isolating chambers 122 that form the above mentioned chamber unit, and the specific arrangement can be set as appropriate.

The above mentioned flexible ring portion 12 is provided at its external side with an opening; the opening is communicated with the chamber and arranged around the external side of the flexible ring portion 12. The above mentioned outer layer portion 11 is arranged at the external side of the flexible ring portion 12 and encloses an opening of the flexible ring portion 12, thereby achieving the enclosure of the chamber inside the flexible ring portion 12.

In order to make the outer layer body 11 have the wear-resistant effect, in this embodiment, the external side of the outer layer body 11 is provided with a wear-resistant layer 111; the wear-resistant layer 111 is arranged around the outer layer portion 11, in this way, when the outer layer portion 11 is contacted with the ground, the wear-resistant layer 111 is contacted with the external ground at first, thereby prolonging the service life of the tire 1.

In order to stabilize the shape of the isolating chamber 122 and enhance the flexible effect of the flexible ring portion 12, in this embodiment, the isolating chamber 122 is provided with a circumferential stiffener 15; two ends of the circumferential stiffener 15 are abutted against inner walls of the isolating chamber 122 respectively, and the circumferential stiffener 15 is arranged to extend along the circumferential direction of the flexible ring portion 12.

In the embodiment, the flexible ring portion 12 is provided with a circumferential gusset 17; the circumferential gusset 17 is arranged around the flexible ring portion 12 and extends along circumferential and radial directions, therefore, the isolating chamber 122 is divided into two side chambers 123 arranged along an axial direction. In this way, under the action of the isolating gusset 14 and the partitioned gusset 17, the chamber of the flexible ring portion 12 is firstly divided into a plurality of isolating chambers 122 arranged along the axis direction, then the isolating chambers 122 are divided into two side chamber 123 arranged around the axis direction. Surely, a plurality of side chambers 123 are arranged to be isolated from each other, i.e., not communicated with each other.

In the embodiment, in order to make the tire 1 be stressed evenly, the above mentioned circumferential gusset 17 is arranged in the middle part of the flexible ring portion 12; in this way, the side chambers 123 divided from the isolating chamber 122 are symmetrically arranged. Surely, according to actual requirements, the circumferential gusset 17 can also be arranged in the middle part of the flexible ring portion 12, then the formed side chambers 123 are arranged asymmetrically, and the specific arrangement can be set as appropriate.

Therefore, under the action of the partitioned gusset 114 and the circumferential gusset 17, only in the case that an external object punctures side chambers 123 of adjacent isolating chambers 122 simultaneously, the partitioned gusset 14 and the circumferential gusset 17 would withstand dynamic load along the radial direction, and at this moment, the tire 1 may keep a high-speed run state; only when the above mentioned puncturing accident happens many times, the tire 1 would have to run in a low speed and require maintenance and repairing.

According the contents above; the side chamber 123 acts as the smallest enclosed chamber unit 1231 of the flexible ring portion 12; in order to ensure that each side chamber 123 of the isolating chamber 122 can be filled with gas, the filling opening 16 arranged inside the flexible ring portion 12 is communicated with the chamber 123 so that it can be ensured that an external filling equipment can fill gas for each side chamber 123 of the flexible ring portion 12.

In order to refine the dimension of the side chamber 123 and enhancing the flexible deformation performance of the flexible ring portion 12, each side chamber 123 is provided therein with an auxiliary circumferential gusset 18; the auxiliary circumferential gusset 18 is arranged to extend along circumferential and radial directions, and divides the side chamber 123 into two chamber units 1231 arranged along an axial direction of the flexible ring portion 12. Surely, in order to avoid the arrangement of redundant filling openings 16 and simplify the design, the filling opening 16 of each side chamber 123 is communicated with two chamber units 1231, then it can use only one filling opening 16 to fill gas for two communicated chamber units 1231 of the side chamber 123 at the same time, and now the auxiliary circumferential gusset 18 functions as the side chamber 123.

Surely, the above mentioned auxiliary circumferential gusset 18 can also be arranged in a round shape, and run through a plurality of side chambers 123 in the same circumferential direction, hence it can be avoided that each side chamber 123 is provided therein with an auxiliary circumferential gusset 18 respectively. The specific configuration can be set as appropriate and is not limited to certain designed structure.

In the embodiment, each chamber unit 1231 is provided therein with a plurality of axial stiffening plates 125; two ends of each axial stiffening plate 125 are abutted against sidewalls of the chamber unit 1231 respectively, in this way, the shape of the chamber unit 1231 can be strengthened greatly, which avoids deformation due to overstress and makes the tire 1 be suitable to withstand relatively big puncture and load.

Specifically, an axial stiffening plate 125 is arranged at the opening of the flexible ring portion 12 and encloses the opening; two ends of the axial stiffening plate 125 are respectively abutted against the sidewall of the chamber unit 1231; and the external side of the axial stiffening plate 125 is abutted against the inner side of the outer layer portion 11; in this way, when the tire 1 is in a run state, the puncture applied by the outer layer portion 11 against the chamber unit 1231 of the flexible ring portion 12 will be obviously reduced.

The surface of the axial stiffening plate 125 of the above mentioned enclosed opening is provided with a convex-concave structure; the convex-concave structure is embedded in the inner side of the outer layer portion 11, in this way, the contact area between the axial stiffening plate 125 and the outer layer portion 11 is increased, which obviously improves the supporting effect.

In the embodiment, the axial stiffening plate 125 arranged in the chamber unit 1231 is respectively connected with the auxiliary circumferential gusset 18, the circumferential stiffener 15, and the partitioned gusset 14 through hole sites.

In the embodiment, the flexible ring portion 12 is in a symmetrical shape, and two end surfaces of the flexible ring portion 12 are respectively of step shapes 128 and of contracted shapes along the radial direction; in this way; it is helpful for the cooperation between the inner support ring 13 and the flexible ring portion 12, and the cooperation is very stable; the inner support ring 13 is arranged at the inner side of the flexible ring portion 12 and abutted against two end surfaces of the flexible ring portion 12.

During the run process of the tire 1, the flexible ring portion 12 will be deformed due to stress and produce abundant heat; in order to help heat dissipation, the two end surfaces of the flexible ring portion 12 are respectively provided with a plurality of heat dissipation slots 121; the plurality of heat dissipation slots 121 are arranged around the flexible ring body 12.

Specifically, the plurality of heat dissipation slots 121 respectively correspond with a plurality of partitioned gussets 14, that is, along an axial direction, the heat dissipation slots 121 and the partitioned gusset 14 are configured to be aligned with each other. Furthermore, the heat dissipation slots 121 are arranged to extend along the radial direction of the flexible ring portion 12, alternatively, in other embodiments, the heat dissipation slots 121 can also be arranged to extend in other ways, which is not merely limited to the arrangement in the embodiment.

The above mentioned partitioned gusset 14 is further provided with heat dissipation holes 124 arranged to extend along the radial direction, which further facilitates the heat dissipation effect of the flexible gusset.

Furthermore, the filling opening 16 of each side chamber 123 is provided therein with a metal ring 127 which surrounds the filling openings 16. Due to the heat conduction effect of the metal rings 127, the heat produced in each side chamber 123 can be dissipated, and the heat dissipation effect of the flexible ring body 12 can also be extremely enhanced.

In the embodiment, the inner support ring 13 is provided with a plurality of filling openings 16; and the plurality of filling openings 16 are arranged alternately. In order to improve the heat dissipation effect of the flexible ring portion 12, metal tubes are arranged between adjacent filling openings 16; the metal tubes are embedded in the flexible ring portion 12 and connected with a hole of the metal ring 127. In the way, due to the heat conduction effect of the metal tube, the heat produced by the flexible ring portion 12 can be dissipated to the outside.

The above contents are just preferred embodiments of the invention, and should not be deemed as limitation to the invention. Any modifications, equivalences and improvements made within the spirit and principle of the invention should be included in the protection scope of the invention.

What is claimed is:

1. A multi-chamber tire comprising an outer layer portion and a flexible ring portion in an annular fashion; the outer layer portion is arranged on an external side of the flexible ring portion; the flexible ring portion is provided with a chamber arranged around the flexible ring portion; wherein the chamber is provided therein with a plurality of partitioned gussets; each of the partitioned gussets is arranged to extend along axial and radial directions of the flexible ring portion, and the plurality of partitioned gussets are arranged alternately around the flexible ring portion so as to divide the chamber into a plurality of isolating chambers isolated from each other, wherein, a plurality of isolating chambers abut in order and form one chamber unit, and the plurality of isolating chambers are intercommunicated in the chamber unit; and wherein, an inner side of the flexible ring portion is provided with an inner support ring; the inner support ring is arranged around the flexible ring portion and provided with a plurality of filling openings which are communicated with the isolating chambers respectively;

wherein the isolating chamber is provided with a circumferential gusset extends along the radial and circumferential directions of the flexible ring portion, the partitioned gusset and the circumferential gusset are able to withstand dynamic load when at least one of the two adjacent isolating chambers is punctured;

wherein both top ends of the partitioned gusset and the circumferential gusset are connected to an inner surface of the outer layer portion, and both bottom ends of the partitioned gusset and the circumferential gusset are connected to an inner surface of the flexible ring portion.

2. The multi-chamber tire of claim 1, wherein the isolating chamber is provided therein with a circumferential stiffener; the circumferential stiffener is arranged to surround the circumferential direction of the flexible ring portion and extend along the circumferential direction of the flexible ring portion; two ends of the circumferential stiffener are respectively abutted against the inner wall of the isolating chamber.

3. The multi-chamber tire of claim 2, wherein; the circumferential gusset is arranged around the flexible ring portion and, dividing the isolating chamber into two side chambers arranged axially; the two side chambers are arranged to be isolated from each other.

4. The multi-chamber tire of claim 3, wherein the plurality of filling openings are communicated with the side chambers respectively, each side chamber is provided therein with an auxiliary circumferential gusset; the auxiliary circumferential gusset is arranged around the flexible ring portion, and divides the side chamber into two chamber units arranged along the axial direction of the flexible ring portion, and the filling opening of the side chamber is communicated with two chamber units of each side chamber.

5. The multi-chamber tire of claim 4, wherein each of the chamber unit is provided with an axial stiffening plate; the axial stiffening plate is arranged along the axial direction of the flexible ring portion; two ends of the axial stiffening plate are respectively abutted against the sidewall of the chamber unit.

6. The multi-chamber tire of claim 5, wherein an external side of flexible ring portion is provided an opening communicated with the chamber; the outer layer portion encloses the opening; the chamber unit is provided therein with a plurality of axial stiffening plates which are arranged alternately; the plurality of axial stiffening plates are respectively arranged at the opening of the chamber and inside the chamber unit.

7. The multi-chamber tire of claim 6, wherein the axial stiffening plate arranged in the chamber unit is respectively connected with the auxiliary circumferential gusset, the circumferential stiffener, and the partitioned gusset through hole sites.

8. The multi-chamber tire of claim 7, wherein the axial stiffening plate is arranged at an opening of the flexible ring portion, encloses the opening, and is respectively abutted against the inner side of the outer layer portion; a surface of the axial stiffening plate is of a convex-concave shape and embedded in the inner side of the outer layer portion.

9. The multi-chamber tire of claim 1, wherein two ends of the flexible ring portion are respectively provided with a plurality of heat dissipation slots; the plurality of heat dissipation slots are arranged around the flexible ring body; and along the axial direction of the flexible ring portion, the heat dissipation slots and the partitioned gusset are aligned with each other.

10. The multi-chamber tire of claim 4, wherein the filling opening is provided therein with a metal ring.

11. The multi-chamber tire of claim 10, wherein the plurality of filling openings are arranged alternately, and a metal tube which is capable of dissipating heat is arranged between adjacent filling openings; the metal tube is embedded in the flexible ring portion and connected with a hole in the metal ring.

12. The multi-chamber tire of claim 4, wherein the auxiliary circumferential gusset is arranged in a round shape, and run through the plurality of side chambers in the same circumferential direction.

13. The multi-chamber tire of claim 1, wherein the flexible ring portion is in a symmetrical shape, and two end surfaces of the flexible ring portion are respectively of step shapes and of contracted shapes along the radial direction.

14. The multi-chamber tire of claim 13, wherein the inner support ring is arranged at an inner side of the flexible ring portion and abutted against two end surfaces of the flexible ring portion.

15. The multi-chamber tire of claim 1, wherein the partitioned gusset is provided therein with a heat dissipation hole; the heat dissipation hole is arranged to extend along the radial direction.

* * * * *